United States Patent Office 3,453,146
Patented July 1, 1969

3,453,146
METHOD AND APPARATUS FOR REFORMING CARBONACEOUS FUELS AND OPERATING FUEL CELL
Mohendra S. Bawa and James K. Truitt, Dallas, Tex., assignors to Texas Instruments Incorporated, Dallas, Tex., a corporation of Delaware
Filed Jan. 3, 1966, Ser. No. 518,409
Int. Cl. H01m 27/20
U.S. Cl. 136—86                    12 Claims This invention relates to a method and apparatus for producing energy. More specifically it relates to a method and apparatus for reforming carbonaceous fuels and a system for using reformed carbonaceous fuel to produce electrical energy.

Direct conversion of carbonaceous fuels to electrical energy by various types of fuel cells and fuel cells systems has been proposed in the prior art. Most fuel cells, however, use only pure hydrogen for fuel. Recently, fuel cells capable of using impure hydrogen have been developed. However, conversion of carbonaceous fuels to suitable impure hydrogen fuel has heretofore involved expensive, bulky and complex equipment. For example, conversion of gaseous hydrocarbons to impure hydrogen may be accomplished by partial oxidation of hydrocarbons. However, careful control of the reaction is required to prevent carbon formation and the reaction must be carried out at temperatures in excess of 1200° C.

Another classic conversion process, known as steam reforming of hydrocarbons, has also been used. In this process steam is reacted with hydrocarbons to produce molecular hydrogen and carbon monoxide. This reaction, however, is endothermic and requires a catalyst. The reaction must be maintained at a temperature of about 350° C. to about 750° C. Furthermore, the usual catalysts, such as nickel and nickel alloys, are easily poisoned by impurities such as sulfur commonly found in hydrocarbon fuels.

It is therefore an object of this invention to provide a method and apparatus for converting common carbonaceous fuels to impure hydrogen fuel suitable for fuel cell use. A further object is to provide an inexpensive apparatus for steam-carbon dioxide reforming hydrocarbons which is not subject to catalyst poisoning. Still another object is to provide an inexpensive system for direct conversion of carbonaceous fuels to electrical energy which is simple, efficient, operates at low temperatures, and is not subject to catalyst poisoning.

Figure 1:
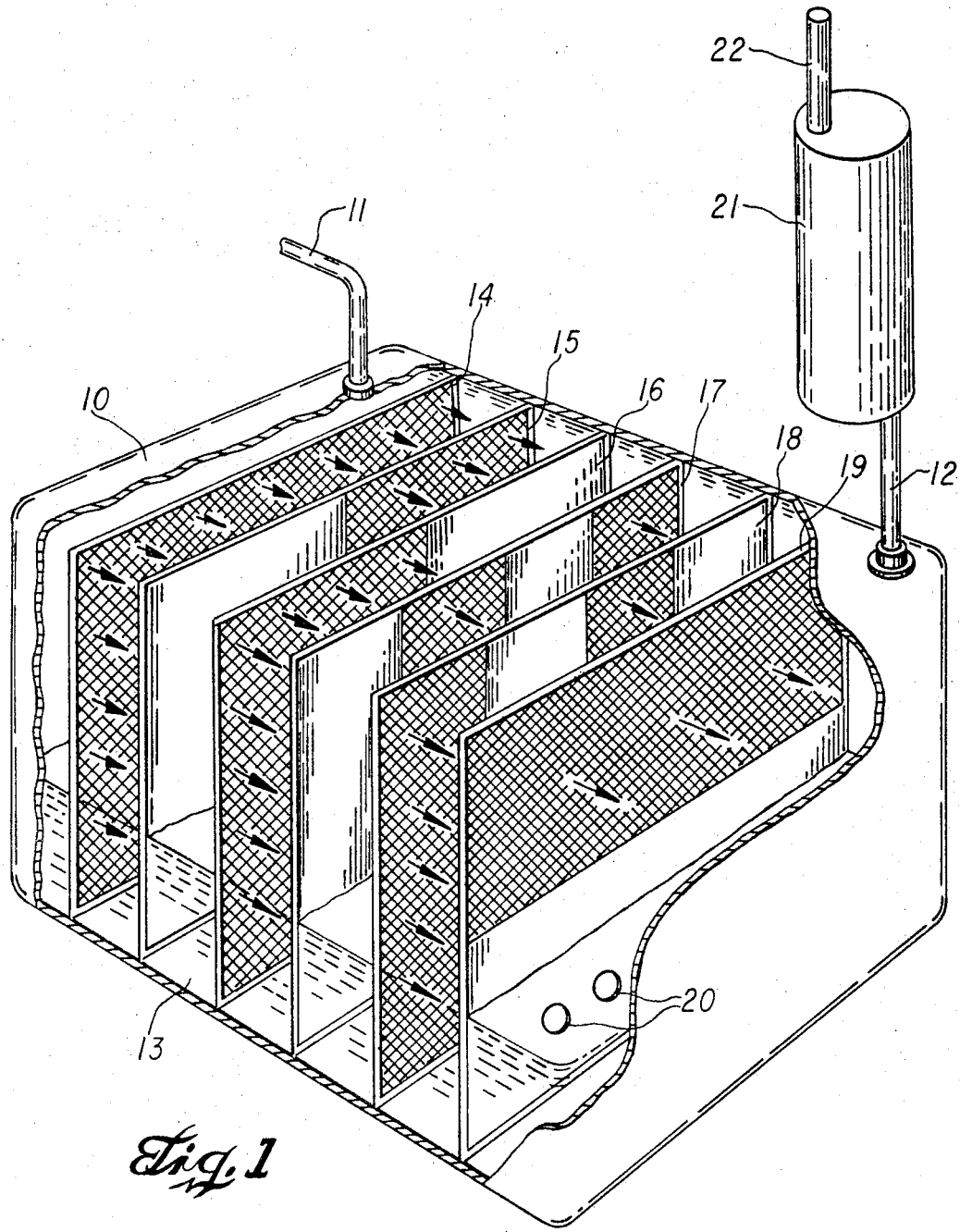
Figure 2:
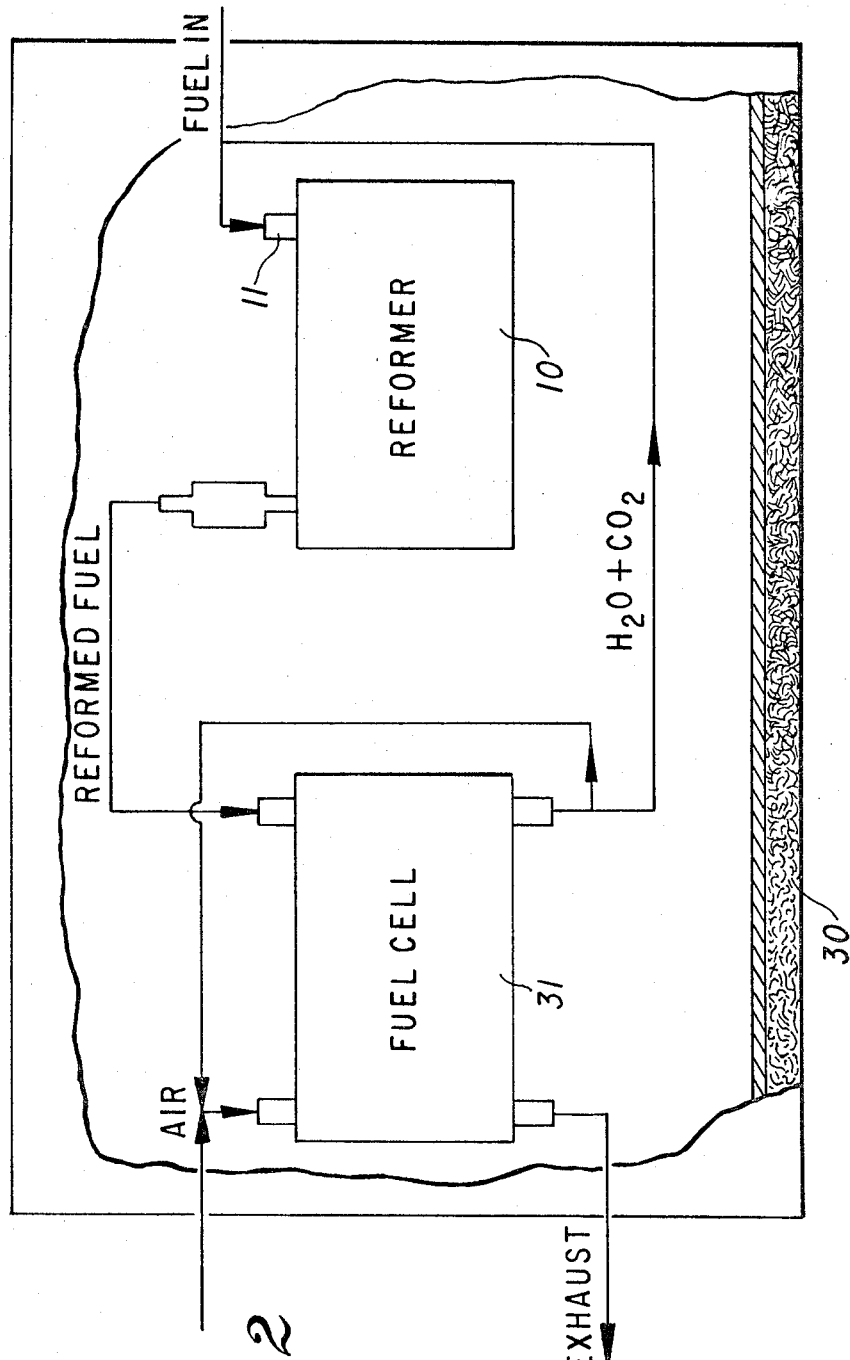

A particular advantage of the reformer and fuel cell system of this invention is the high efficiency and low temperature operation obtained while avoiding poisoning of the catalyst. Other objects, features and advantages will become more readily understood in the following detailed description when read in conjunction with the appended claims and attached drawing in which:

FIGURE 1 is a pictorial view partially in section of one embodiment of the molten salt reformer of this invention, and FIGURE 2 is a schematic illustration of the fuel cell and reformer system.

In accordance with the invention, impure hydrogen is produced from hydrocarbon fuels through a steam reforming reaction. A mixture of steam and hydrocarbon fuel is passed through a reformer containing a molten inorganic salt and a catalyst. In the preferred embodiment of the invention, the reformer is comprised of a container having a plurality of foraminous baffles which support a molten inorganic salt. The baffles are preferably comprised of a plurality of screens. The screens are nickel or chrome steel, thus providing the desired catalytic surface. The reaction gases are passed through the foraminous baffles to effect maximum contact between the reacting gases and the catalyst. The screen baffles support a molten inorganic salt such as carbonates or sulfates of sodium, potassium or lithium or mixtures thereof. The molten salt acts as a heat transfer medium to improve heat transfer to the fuel mixture and aids in cracking aromatic and branched chain hydrocarbons, thus making them more suitable for reforming reactions. Furthermore, molten salts scavenge sulfur and lead compounds to prevent poisoning of the catalyst.

With specific reference to FIGURE 1 a steam reformer unit is shown. The fuel reformer unit comprises an enclosed container 10 having an inlet 11 and an outlet 12. The container 10 is partially filled with an inorganic salt 13 such as carbonates or sulfates of sodium, lithium, or potassium or mixtures thereof. A plurality of baffles 14, 15, 16, 17, 18 and 19 are suspended substantially vertically within the container 10 between inlet 11 and outlet 12. The baffles are comprised of a plurality of screens. The screens are nickel, nickel alloy or chrome steel. At the operating temperature of the reformer, the inorganic salt 13 is molten and climbs the screen baffles by surface tension to provide a thin layer of molten salt on the surface of the screens.

As shown in FIGURE 1 the baffles may be part screen and part blank or unperforated and so positioned within the reactor 10 to cause the gases flowing therethrough to pass in a circuitous path, thus lengthening its exposure to the catalyst and molten salt. The last baffle 19 in the direction of the gas flow is conveniently about half screen and about half unperforated. The baffle is arranged so that the foraminous portion thereof is above the molten salt 13 as shown in FIGURE 1. The liquid does not climb the unperforated portion up to the screen. The baffle is so arranged to collect entrained molten salt on the screen. The molten salt collected on the screen drains down the unperforated portion and into the liquid 13. A plurality of holes 20 in the solid blank portion of baffle 19 allows molten salt trapped behind baffle 19 to flow back into the reactor thus maintaining an equilibrium level of salt within the reactor.

An expansion trap 21 is placed on the outlet 12. Gases entering through outlet 12 expand in trap 21 precipitating out entrained liquid salt. The reformed gas then exits through outlet 22 to be fed into the fuel cell.

In the preferred embodiment of the invention the baffle screens are made of nickel, nickel alloys, or chrome steel, thus providing the catalytic surface necessary for the reforming reaction. The molten salt 13 climbs the screen by surface tension. The screen baffles are preferably made of two of more screens intimately joined. In the preferred embodiment, screens of different mesh size are laminated together to form a 2 ply baffle. A 2 ply baffle of 50 and 120 mesh screens have been successfully used to raise a film of $NaLiCO_3$ four inches above the liquid surface. The thickness and height of the molten salt film on the screen varies with the mesh size of the screen and the molten salt used, thus the screen mesh may be selected to provide any desired film of salt.

The screen may be of any suitable catalyst material, such as nickel or nickel alloys. Stainless steels such as 430, 446 and 416 steels containing 20 to 30% chromium may also be used. Other materials which provide the desired catalytic surface and which will withstand exposure to molten inorganic salts may also be used.

The molten salt 13 may be any suitable salt which is liquid at the temperature of operation of the reformer. Preferably the salt is a sulfate or carbonate of lithium, sodium or potassium or mixtures thereof. These salts have a high heat capacity and are stable in the temperature range of 350°–750° C. The high heat capacity of the salt helps to maintain the temperature of the fuel mixture and the catalyst at the desired reaction temperature. The salts also aid in cracking complex aliphatic and aromatic hydrocarbons. The mixture of salts may be varied with desired operating temperature. For example a ternary mixture of $Na_{0.4}Li_{0.8}K_{0.8}CO_3$ melts at about 350° C. Sodium lithium carbonate ($NaLiCO_3$) melts at about 500° C. These mixtures are ideal for low temperature reforming of fuels containing sulfur or lead. When the hydrocarbon fuel being reformed contains a low percent of sulfur, salts such as sulfates of sodium, lithium or potassium may be used. For example sodium lithium sulfate ($NaLiSO_4$) melts at about 550° C. and can be used to scavenge lead from low sulfur content fuels while supplying the desired characteristics of the molten salt heat transfer medium described above.

The hydrocarbon fuel reformer of this invention is preferably operated in combination with a fuel cell or fuel cell stack adapted to utilize impure hydrogen fuel. Typical of such fuel cells is the molten carbonate fuel cell such as that described in "Electrode Processes in Molten Carbonate Fuel Cells," Advances in Chemistry Series, No. 47, page 232, published by The American Chemical Society, Washington, D.C. (1965). Operation of the fuel reformer in combination with a fuel cell is graphically illustrated in FIGURE 2. Gaseous hydrocarbon fuel is mixed with spent fuel from the fuel cell or $H_2O$ and fed into the reformer 10 described above. Any suitable hydrocarbon fuel such as kerosene, methanol, JP-4, etc. may be used. The reformer is maintained at a suitable temperature between about 350° C. and about 750° C. as determined by the inorganic salt used and the fuel to be reformed. Complex branched chain and aromatic hydrocarbons are cracked in the presence of hot inorganic salts to form simpler hydrocarbons and free hydrogen. The simpler hydrocarbons react with steam according to the classical steam reforming reaction $$x(\cdot CH_2 \cdot) + xH_2O \rightarrow xCO + 2xH_2$$

in the presence of a suitable catalyst. In the presence of excess $H_2O$ the carbon monoxide reacts with steam according to the classical water-gas shift reaction $$CO + H_2O \rightleftharpoons CO_2 + H_2$$

thus producing more free hydrogen. Both reactions occur at a temperature of about 350° C. to about 750° C.; higher temperatures favoring the formation of free hydrogen.

The steam reforming reaction requires a catalyst such as nickel or chrome steel. Since the reaction is endothermic, thermal energy must be supplied while the reactants are in contact with the catalyst. Thermal energy is transferred to the catalyst screen described above through the use of liquid inorganic salts which have a high heat capacity. Sulfates and carbonates of potassium, lithium and sodium have suitable high heat capacities and ternary mixtures thereof can be formed to provide a heat transfer medium with a melting point corresponding to any desired temperature within the operating range. The reformer is preferably maintained at a temperature slightly above the melting point of the inorganic salt, thus realizing maximum efficiency of the liquid as a heat transfer medium.

As noted above, the molten salts also help in cracking complex hydrocarbon chains and aromatics. The inorganic salts further scavenge lead and sulfur from the fuel stream by forming lead and sulfur compounds, thus purifying the fuel process stream to prevent poisoning of the catalyst.

The reformer is maintained at a temperature between about 350° C. and about 750° C. By combining the reformer with a fuel cell 31 within an insulating chamber 30, as shown in FIGURE 2, the reformer can use waste heat from the fuel cell.

The efficiency of the reformer of this invention is dependent on the type and purity of the hydrocarbon fuel used, the temperature of operation, and the heat transfer medium used. In combination with a fuel cell as shown in FIGURE 2, $H_2O$ for the reforming reaction can be supplied from the effluent from the fuel cell, thus providing an efficient fuel cell system which requires no outside supply other than the fuel supply. In such an arrangement up to 80% of common fuels such as JP-4 can be converted directly to usable fuel for the fuel cell. Furthermore, unused fuel can be recycled through the system to obtain even higher efficiencies. In the system of FIGURE 2, reformed fuel is fed directly from the reformer 10 into the fuel cell 31. The reformed fuel may contain hydrogen, carbon monoxide, carbon dioxide, and hydrocarbon fuel. The effluent from the fuel side of the fuel cell 31 contains $H_2O$, $CO_2$ and unused hydrocarbon fuel. Part of the effluent is recycled back to the fuel inlet 11 to supply water for the steam reforming reaction. The remainder of the effluent is fed into the air side of the fuel cell to supply $CO_2$ or burned to supply heat for the fuel cell.

Although the invention has been described with reference to reforming hydrocarbon fuels for use in a fuel cell system, it will be understood that the steam reformer described may be used in other processes wherein impure hydrogen is utilized. Furthermore, the invention is not limited to reforming gaseous hydrocarbons, but may be used to reform any carbonaceous fuel.

It is to be understood that the above-described embodiments of the invention are merely illustrative of the principles of the invention. Numerous other arrangements and modifications may be devised by those skilled in the art without departing from the spirit and scope of the invention as defined by the appended claims.

What is claimed is:

1. A carbonaceous fuel reformer comprising an enclosed container having a plurality of foraminous baffles supported therein, means for introducing a mixture comprising $H_2O$ and carbonaceous fuel into said container, a liquid inorganic salt supported within the foramina of said baffles, and means for removing reformed fuel from said container.

2. The fuel reformer of claim 1 wherein said foraminous baffles are comprised of a plurality of nickel, nickel alloy, or chrome steel screens.

3. The fuel reformer of claim 1 wherein said liquid inorganic salt is a carbonate or sulfate of sodium lithium, or potassium or mixtures thereof.

4. The fuel reformer of claim 2 wherein said inorganic salt is $NaLiCO_3$.

5. An apparatus for converting carbonaceous fuel to electrical energy comprising
   (a) a fuel cell,
   (b) a carbonaceous fuel reformer, said carbonaceous fuel reformer comprising an enclosed container partially filled with sulfates or carbonates of sodium, lithium or potassium or mixtures thereof and having a plurality of foraminous baffles therein, said baffles being comprised of nickel, nickel alloys, or chrome steel and supporting said sulfates or carbonates within the foramina thereof, said baffles being positioned between the inlet and outlet of said fuel reformer,
   (c) means for mixing $H_2O$ produced by said fuel cell with said carbonaceous fuel and introducing the mixture into said inlet of said carbonaceous fuel reformer, and
   (d) means for withdrawing impure hydrogen from said reformer and introducing said impure hydrogen into said fuel cell.

6. The apparatus as described in claim 5 wherein said fuel cell and said fuel reformer are enclosed within an insulated container.

7. The method of reforming hydrocarbon fuel to impure hydrogen comprising the steps of
   (a) mixing said hydrocarbon fuel with $H_2O$, and
   (b) passing the mixture of hydrocarbon fuel and $H_2O$ through foraminous catalyst plates having carbonates or sulfates of lithium, sodium, or potassium or mixtures thereof within the foramina of said catalyst plates.

8. The method of claim 1 wherein said catalyst plates are comprised of a plurality of intimately contacting screens of nickel, nickel alloys, or chrome steel.

9. The method of converting carbonaceous fuel to electrical energy wherein impure hydrogen is fed into the fuel side of a fuel cell and air is fed into the oxidant side of said fuel cell, thereby producing electrical energy, $CO_2$ and $H_2O$, comprising the steps of
   (a) mixing said $H_2O$ produced by said fuel cell with a carbonaceous fuel,
   (b) passing the mixture of $H_2O$ and carbonaceous fuel through a foraminous catalyst having a coating of inorganic salt thereon,
   (c) maintaining said foraminous catalyst at a temperature between about 350° C. and about 750° C., thereby reforming said carbonaceous fuel to impure hydrogen and carbon dioxide, and
   (d) feeding said impure hydrogen and carbon dioxide into said fuel side of said fuel cell.

10. The method of claim 9 wherein said carbonaceous fuel is a gaseous hydrocarbon.

11. The method of claim 10 wherein said foraminous catalyst is a plurality of screen baffles comprised of nickel, nickel alloys or chrome steel.

12. The method of claim 11 wherein said inorganic salt is comprised of carbonates or sulfates of lithium, sodium, or potassium or mixtures thereof.

References Cited

UNITED STATES PATENTS

| 1,403,189 | 1/1922 | Palmer | 23—212 |
| 1,926,587 | 9/1933 | Hansgirg | 23—212 |
| 3,179,500 | 4/1965 | Bowen et al. | 23—212 X |
| 3,251,718 | 5/1966 | Hilton | 136—86 |
| 3,252,774 | 5/1966 | McMahon et al. | 48—214 |

ALLEN B. CURTIS, *Primary Examiner.*

U.S. Cl. X.R.

23—212, 288; 48—105, 214